United States Patent [19]

Kooijman

[11] Patent Number: 4,626,228

[45] Date of Patent: Dec. 2, 1986

[54] ADJUSTABLE SPROCKET WHEEL AND TRANSMISSION MECHANISM

[76] Inventor: Hendrikus P. Kooijman, Brederodestraat 26B, 2042 BB Zandvoort, Netherlands

[21] Appl. No.: 594,259

[22] Filed: Mar. 28, 1984

[51] Int. Cl.$^4$ .............................................. F16H 9/02
[52] U.S. Cl. ...................................................... 474/49
[58] Field of Search ................... 474/49, 152, 162, 163

[56] References Cited

U.S. PATENT DOCUMENTS

| | | | |
|---|---|---|---|
| 577,323 | 2/1897 | Ross | 474/49 |
| 3,230,788 | 1/1966 | Henley | 474/49 |
| 3,798,989 | 3/1974 | Hunt | 474/49 |

FOREIGN PATENT DOCUMENTS

| | | | |
|---|---|---|---|
| 835689 | 12/1938 | France | 474/49 |
| 457034 | 3/1950 | Italy | 474/49 |
| 282276 | 12/1927 | United Kingdom | 474/49 |

Primary Examiner—James A. Leppink
Assistant Examiner—Frank H. McKenzie, Jr.

Attorney, Agent, or Firm—Frost & Jacobs

[57] ABSTRACT

An adjustable sprocket wheel and transmission mechanism, the sprocket wheel having two toothed wheel segments each having a sector angle of substantially 180°, the wheel sections being interconnected by a lever system arranged to incrementally increase the diameter of the sprocket wheel defined by the wheel segments, one of the pedal cranks being connected to each of the wheel segments by crank pivots mounted on projections lying adjacent the periphery of the wheel segments, the wheel segments each having a recess positioned to receive the projection of the other wheel segment when the segments are in a retracted position to define a circular sprocket wheel, the lever system including levers pivotally connected to each of the two wheel segments, the levers being selectively engagable in recesses in the other wheel section, the transmission mechanism including actuating cams arranged to incrementally move the levers to selectively change the diameter of the sprocket wheel.

5 Claims, 4 Drawing Figures

ADJUSTABLE SPROCKET WHEEL AND TRANSMISSION MECHANISM

BACKGROUND OF THE INVENTION

The present invention relates to an adjustable sprocket wheel and transmission mechanism for optimizing the energy exerted by the bicyclist, comprising two toothed wheel segments each having a sector angle of substantially 180°, which are interconnected by means of lever systems provided with springs arranged in such a way that the sprocket wheel diameter can be changed as bicyclist supplies energy to the cranks which drive the sprocket wheel.

Such a sprocket wheel and transmission mechanism is known from the U.S. Pat. No. 3,798,989. This known sprocket wheel comprises additional small toothed wheel segments which bridge the distance between the 180° toothed wheel segments when the 180° segments are adjusted relative to each other. The linking between the toothed wheel segments and the small toothed wheel segments is such that upon pedaling forwardly the additional small segments act to force the toothed wheel segments forwardly. In order to prevent "spraining" of the toothed wheel segments, they should be locked between discs. Such arrangement makes the known sprocket wheel complicated and also heavy, and upon penetration of dirt satisfactory operation becomes questionable.

Furthermore, owing to the presence of the additional small toothed wheel segments the maximally obtainable "speed" is rather limited because upon each rotation of the sprocket wheel larger angles will appear in the chain, which results in a less flexible drive and in irregular and greater wear. Moreover the chain will tend to rattle upon fast pedaling in the high position.

The present invention aims to improve the foregoing.

SUMMARY OF THE INVENTION

According to the invention one of the cranks is connected with each of the toothed segments by a crank pivot situated near the nominal diameter of the sprocket wheel on a projection on each of the toothed segments which, when the toothed segments define a circular sprocket wheel is situated in a recess in the other toothed segment. The toothed segments are connected by lever systems comprising levers with their outside ends pivotally connected to one of the two segments and the opposite ends provided with a pin which is movable in various positions in an adjustment groove of the other toothed segment, the toothed segment being spring loaded towards one another about the crank pivots and the levers spring loaded about their pivots from the crank.

In one embodiment the levers consist of rods which are bent at one end to form transmission pins proturbing through the adjustment grooves in the toothed segments, transmission blocks being provided which are adapted to cooperate with the pins of a transmission mechanism provided on the rear side of the toothed segments.

In a simplified embodiment the pivots at the outside ends of the levers coincide with the crank pivots.

The transmission pins of the transmission mechanism act to enlarge the sprocket wheel acting through transmission blocks situated near the outer diameter of the sprocket wheel. The transmission pins of the transmission mechanism are preferably positioned onto an adjustable piece also supporting a rotatable pawl with two stop slip ends which can fall into recesses of a stop segment.

DESCRIPTION OF THE DRAWINGS

Figure 1:
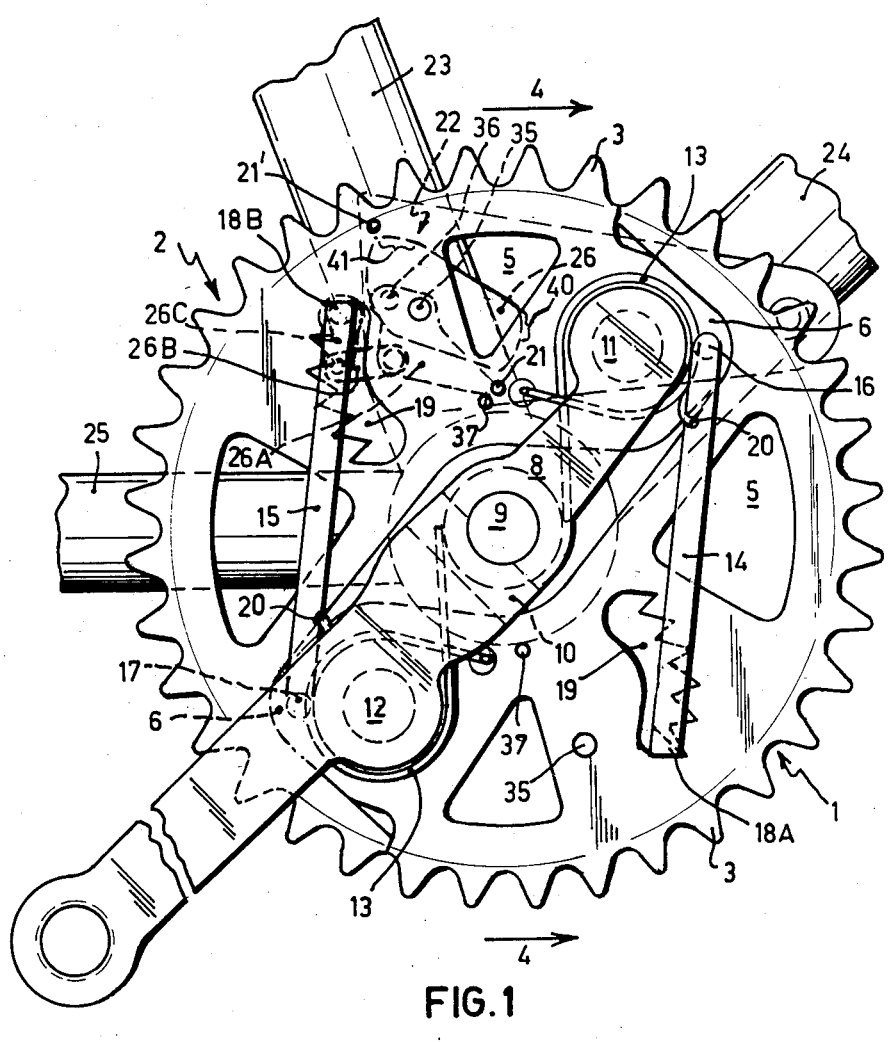
FIG. 1 is a side elevational view of the sprocket wheel in the smallest or circular position.
Figure 2:
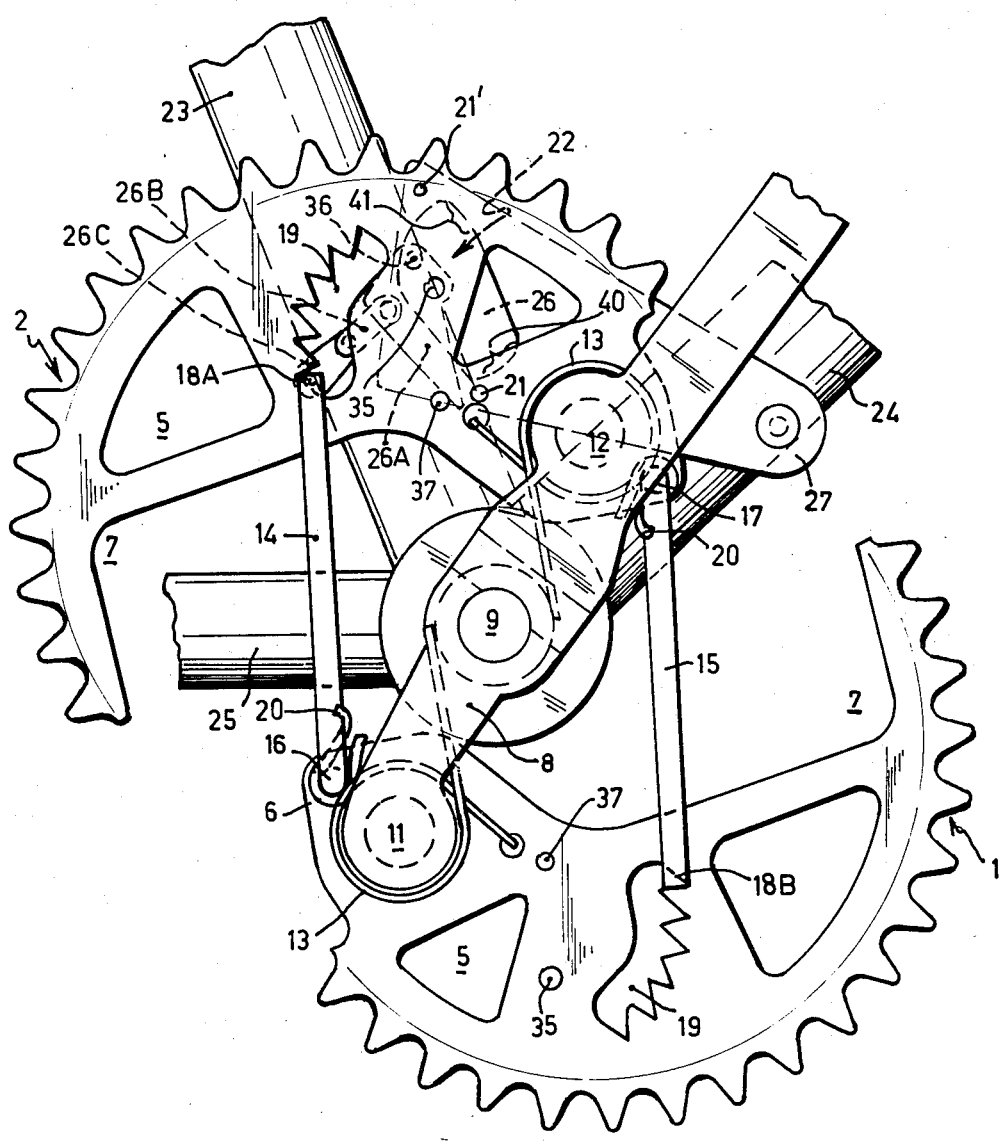
FIG. 2 shows the sprocket wheel of FIG. 1 in its largest, fully extended position.

The sprocket wheel represented in FIGS. 1 and 2 in two different positions of use comprises two sprocket wheel segments 1 and 2 each having a sector angle of substantially 180°. Teeth are provided along the outer circumference of the sprocket wheel segments, which come into and out of engagement with a chain (not shown), the direction of movement of which is indicated by the arrows 4. The sprocket wheel segments 1 and 2 have openings 5 which are known and are only important for the savings of weight.

Each of the sprocket wheel segments 1 and 2 has a projection 6 and a recess 7, the latter for ease of illustration being indicated only in FIG. 2. In the circular position of the sprocket wheel shown in FIG. 1 the projections 6 are seated almost completely in opposite recesses 7, but in the extended positions of the sprocket wheel (see FIG. 2) the projections 6 are removed from the recesses 7. Owing to the positioning of the pivots of the lever system to be described hereinafter the pitch "t" or "n.t", respectively, between two teeth is barely changed on the non-adjusted side if the other side is adjusted by means of the operating member for enlarging or reducing the sprocket wheel, which will also be described hereinafter.

The projections 6 are interconnected by a crank 8 having a bore 9 for a pedal shaft (not shown) which is locked in the bore 9 in known manner, as for instance by a screw pin (not shown) extending through pin hole 10. The projections 6 are linked to the crank 8 by means of crank pivots 11 and 12 which are loaded towards one another by springs 13, i.e. the springs 13 push the toothed wheel segments 1 and 2 towards one another in the direction of the circular position of the sprocket wheel.

It should be noted that the projections 6 should be "pulled" upon pedaling forwardly, so that the rotation of the pedal shaft in FIGS. 1 and 2 corresponds to the clock-wise direction of motion.

The lever system comprises two levers 14 and 15 having fixed pivots 16 and 17, respectively, which are situated outwardly of the crank pivots 11 and 12, respectively, on the projections 6. The locations of the pivots 16 and 17, in combination with the length of the levers 14 and 15 and the angle of these levers with respect to the crank 8 insure that the tooth pitch "t" is not notably changed during adjustment, and that, because the adjustment takes place in two stages: pedaling forwardly 180° results in adjusting the first segment, and pedaling forwardly 360° more results in adjusting the second segment.

The levers 14 and 15 terminate at their opposite ends in transmission pins 18A and 18B, respectively, which during the extension of the sprocket wheel are movable in various recesses of the adjustment grooves 19 provided in the sprocket wheel segments 1 and 2. Springs 20 are provided on the pivots 16 and 17 to move the levers radially with respect to the crank 8.

The levers 14 and 15 may be formed as pairs of relatively thin plates on both sides of the sprocket wheel segments 1 and 2, but they may also consist of rods which are bent at one end to form the transmission pins 18A and 18B.

A further simplification of the construction is also possible by making the fixed pivots 16 and 17 of the levers 14 and 15 coincide with the crank pivots 11 and 12.

In FIGS. 1 and 2 two pins 21 and 21' of a transmission mechanism 22 are shown, said mechanism being fastened to the saddle tube 23 of the bicycle frame. The bicycle frame also includes a tube 24 directed towards the steering-bar and a fork 25 directed towards the rear wheel. The pin 21 is used to enlarge the sprocket wheel and the other pin 21' is used to reduce the size of the sprocket wheel. Both pins operate the transmission block 26 one of which is shown in dotted lines in FIGS. 1 and 2, the blocks beings pivotally mounted to the rear side of the two toothed segments.

Upon enlargement of the toothed segments these blocks are passive, but upon reducing the size of the toothed segments the ends 18A and 18B of levers 14 and 15 are removed from the recesses in grooves 19 in which they are seated in adjacent recesses in the grooves 19, thereby promoting flexible transmission. The place where the transmission mechanism is fastened to the frame is fixed, since the transmission should occur when the toothed segment to be adjusted is free from the chain to the side where the longest movement (putting out or in gear) takes place.

Figure 3:
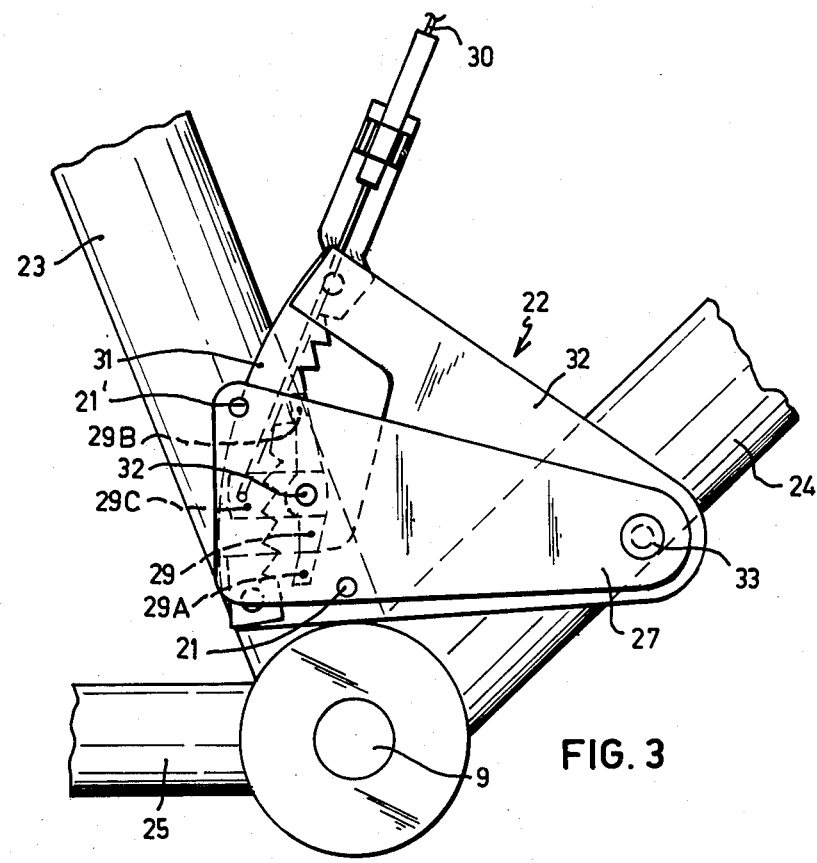
FIG. 3 is a side elevational view of the transmission mechnism.
Figure 4:
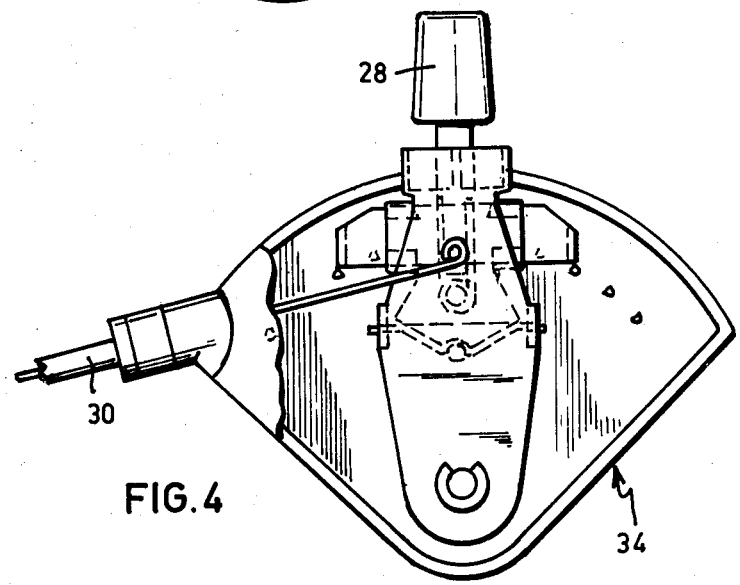
FIG. 4 is a side elevational view of an operating member.

The transmission mechanism 22, as shown in FIG. 3, further comprises an adjustable piece 27 operated by a handle 28 shown in FIG. 4. This adjustable piece 27 is moved by a rotatable pawl 29 which is connected with the handle 28 through a pull-push cable 30.

The rotatable pawl 29 falls during adjustment into a recess of a stop segment 31, which is fixedly connected to the fixed part 32 of the mechanism 22.

The operation of the transmission mechanism is as follows: by means of the pull/push cable 30 which is operated by the handle 28 at the steering-bar (not shown), causes the pawl 29 to move to the next position. The pawl 29 comprises two stop slip ends 29A and 29B having fixedly connected thereto an operating piece 29C for the cable 30. The pawl 29 is rotatable about shaft 32 in the rear of the movable transmission piece 27, which is rotatable about a pin 33.

By moving handle 28 towards a higher or lower position the transmission pins 21 and 21', respectively, will come into engagement, when the rider is pedaling forwardly, with the transmission block 26 of the first toothed segment.

Upon pedaling further the toothed segment is directed towards a higher or lower position by the transmission mechanism. If the rider continues to pedal, the second toothed segment will come free the chain and the same action occurs as with the first segment.

Once the toothed segments have moved the transmission pins 21 and 21' are free from contact with the transmission blocks 26. Consequently, pedaling 180° results in adjusting one segment, and pedaling 360° or more results in adjusting both segments.

The transmission blocks 26 are rotatably connected to sprocket wheel segments 1 and 2 by pins 35. The complete transmission blocks 26 comprise four parts, namely, 26, 26A, 26B and 26C which are movably connected to each other.

Part 26A is biased by a spring (not shown) toward cam 37 fixed to the toothed segment and is rotatable around pin 35 away from cam 37. Part 26A carries a pin 36 for pivotally supporting part 26 which is kept in a fixed rest position by a spring (not shown). This last mentioned spring is double-acting so that part 26 can rotate clockwise and anticlockwise around pin 36.

Part 26B is a link between 26A and 26C.

Part 26C is rotatably connected to the ends of the levers 14 and 15 carrying the transmission pins 18A and 18B.

If the bicyclist changes gears from a lower to a higher position by moving the handle 28, pin 21 contacts part 26 at 40 and forces part 26 outwardly. Levers 15 and 14 will then be received in a higher recess of adjustment groove 19, and the segments 1 and 2 will be moved outwardly. As soon as this has happened, part 26 will be out of reach of pin 21, because part 26 pivots around pin 36 during this positioning movement.

If the bicyclist changes gears from a higher to a lower position, pin 21' will contact part 26 at 41. Parts 26 and 26A will retract because pin 36 rotates clockwise around pin 35, and part 26C will remove levers 14 and 15 from their seats and move them inwardly into next adjacent seat. The toothed segments then take a lower position. As soon as this has happened, part 26 again will be free of pin 21'.

The operating member 34 represented in FIG. 4 is constructed in such a way that each time handle 28 is adjusted it will move to only one higher or lower position. This enables the bicyclist to choose the right position without problem even in the dark. This position can also be read at the transmission handle.

It should be noted that the sprocket wheel can only be used with a chain tensioner, such as is used as a part of a derailleur-gear.

Embodiments other than those represented in the drawing fall within the scope of the claims.

I claim:

1. An adjustable sprocket wheel and transmission mechanism for optimizing the energy of a bicyclist as he turns the pedal crank of a bicycle, comprising two toothed wheel segments each having a sector angle substantially 180°, the wheel segments being interconnected by means of a lever system provided with springs arranged to incrementally increase the diameter of the sprocket wheel defined by the wheel segments, characterized in that one of the pedal cranks is connected to each of the toothed wheel segments by crank pivots mounted on projections lying adjacent the periphery of the wheel segments, each of the wheel segments having a recess positioned to receive the projection of the other wheel segment when the wheel segments are in a retracted position in which they define a circular sprocket wheel, the lever system comprising a pair of levers each having an inside end and an outside end, each lever being connected at its outside end to one of the wheel segments by fixed pivot points, each of the said levers having a transmission pin at its opposite end movable to various positions in an adjustable groove in the other of the wheel segments, first spring means loading the wheel segments toward one another about their crank pivots, and second spring means spring loading said levers about their fixed pivots.

2. The combination claimed in claim 1 wherein said levers consist of rods which are bent at one end to form transmission pins adapted to engage in the recesses in said wheel segments, and a transmission mechanism mounted on the rear side on each on said toothed segments, said transmission mechanism including transmission blocks positioned to engage additional transmission pins forming a part of the transmission mechanism.

3. The combination claimed in 1 wherein said fixed pivots coincide with said crank pivots.

4. The combination claimed in claim 2 wherein said additional transmission pins are located near the outer diameter of the sprocket wheel.

5. The combination claimed in claim 4 wherein said additional transmission pins are mounted on an adjustable member pivotally mounted for incremental movement relative to said transmission mechanism, said adjustable member mounting a rotatable pawl with two stop slip ends adapted to selectively engage recesses in a fixed member forming a part of said transmission mechanism.

* * * * *